(12) United States Patent
Jiang et al.

(10) Patent No.: US 9,923,193 B2
(45) Date of Patent: Mar. 20, 2018

(54) CATHODE OF LITHIUM-ION BATTERY

(71) Applicants: Tsinghua University, Beijing (CN); HON HAI PRECISION INDUSTRY CO., LTD., New Taipei (TW)

(72) Inventors: Kai-Li Jiang, Beijing (CN); Jia-Ping Wang, Beijing (CN); Shou-Shan Fan, Beijing (CN); Xiao-Yang Lin, Beijing (CN); Peng Liu, Beijing (CN); Shu Luo, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 608 days.

(21) Appl. No.: 14/526,458

(22) Filed: Oct. 28, 2014

(65) Prior Publication Data

US 2016/0028069 A1  Jan. 28, 2016

(30) Foreign Application Priority Data

Jul. 25, 2014 (CN) .......................... 2014 1 0358167

(51) Int. Cl.
| | | |
|---|---|---|
| H01M 4/133 | (2010.01) | |
| H01M 4/583 | (2010.01) | |
| H01M 4/62 | (2006.01) | |
| H01M 4/36 | (2006.01) | |
| H01M 4/02 | (2006.01) | |
| H01M 10/0525 | (2010.01) | |

(52) U.S. Cl.
CPC .......... *H01M 4/133* (2013.01); *H01M 4/583* (2013.01); *H01M 4/625* (2013.01); *H01M 4/366* (2013.01); *H01M 10/0525* (2013.01); *H01M 2004/027* (2013.01); *Y10S 977/75* (2013.01); *Y10S 977/752* (2013.01); *Y10S 977/948* (2013.01)

(58) Field of Classification Search
CPC ........ H01M 4/133; H01M 4/36; H01M 4/583; H01M 4/625; H01M 4/366; H01M 10/0525; H01M 2004/027; Y10S 977/75; Y10S 977/948; Y10S 977/752
See application file for complete search history.

(56) References Cited

U.S. PATENT DOCUMENTS

| | | |
|---|---|---|
| 7,939,218 B2 | 5/2011 | Niu |
| 8,790,744 B2 | 7/2014 | Wang et al. |
| 8,840,991 B2 | 9/2014 | Liu et al. |
| 2004/0121122 A1* | 6/2004 | Reynolds, III ...... H01M 8/0234 428/137 |
| 2006/0188774 A1 | 8/2006 | Niu et al. |

(Continued)

FOREIGN PATENT DOCUMENTS

| | | |
|---|---|---|
| CN | 1460638 | 12/2003 |
| CN | 1631848 | 6/2005 |

(Continued)

*Primary Examiner* — Alex Usyatinsky
(74) *Attorney, Agent, or Firm* — ScienBiziP, P.C.

(57) ABSTRACT

A cathode of lithium-ion battery includes a carbon fiber film. The carbon fiber film includes at least one carbon nanotube film including a number of carbon nanotubes joined end to end and extending along a same direction. Each of the number of carbon nanotubes is joined with a number of graphene sheets, and an angle is between each of the number of graphene sheets and the number of carbon nanotubes.

10 Claims, 6 Drawing Sheets

(56) References Cited

U.S. PATENT DOCUMENTS

| | | | |
|---|---|---|---|
| 2009/0098453 A1* | 4/2009 | Liu | H01M 4/133 429/163 |
| 2009/0117434 A1 | 5/2009 | Liu et al. | |
| 2009/0117437 A1 | 5/2009 | Liu et al. | |
| 2010/0124622 A1 | 5/2010 | Wang et al. | |
| 2011/0318568 A1* | 12/2011 | Liu | B82Y 30/00 428/315.5 |
| 2012/0028123 A1* | 2/2012 | Asari | H01G 11/36 429/231.8 |
| 2012/0103510 A1 | 5/2012 | Wang et al. | |
| 2012/0121973 A1* | 5/2012 | Seo | B82Y 30/00 429/199 |
| 2012/0251766 A1 | 10/2012 | Jiang et al. | |
| 2012/0267581 A1 | 10/2012 | Cai et al. | |
| 2014/0057178 A1 | 2/2014 | He et al. | |
| 2014/0302394 A1* | 10/2014 | Yue | H01M 4/366 429/231.8 |

FOREIGN PATENT DOCUMENTS

| | | |
|---|---|---|
| CN | 1754277 | 3/2006 |
| CN | 101107734 A | 1/2008 |
| CN | 101425584 | 5/2009 |
| CN | 101425584 A | 5/2009 |
| CN | 101734618 | 6/2010 |
| CN | 101880036 | 11/2010 |
| CN | 101880036 A | 11/2010 |
| CN | 102049890 | 5/2011 |
| CN | 103199254 A | 7/2013 |
| TW | 201241843 | 10/2012 |
| TW | 201242892 | 11/2012 |
| TW | 201409809 | 3/2014 |

* cited by examiner

CATHODE OF LITHIUM-ION BATTERY

CROSS-REFERENCE TO RELATED APPLICATIONS

This application claims all benefits accruing under 35 U.S.C. § 119 from China Patent Application No. 201410358167.5, filed on Jul. 25, 2014, in the China Intellectual Property Office. This application is related to commonly-assigned application entitled, "METHOD FOR MAKING CARBON FIBER FILM", concurrently filed Ser. No. 14/526,449; "CARBON FIBER FILM", concurrently filed Ser. No. 14/526,459; "MEMBRANE ELECTRODE ASSEMBLY OF FUEL CELL", concurrently filed Ser. No. 14/526,456. Disclosures of the above-identified applications are incorporated herein by reference.

FIELD

The present application relates to a cathode of lithium-ion battery.

BACKGROUND

In recent years, lithium batteries have received a great deal of attention and are used in various portable devices, such as notebook PCs, mobile phones and digital cameras for their small weight, high discharge voltage, long cyclic life and high energy density compared with conventional lead storage batteries, nickel-cadmium batteries, nickel-hydrogen batteries, and nickel-zinc batteries.

An anode of a lithium battery should have such properties as high energy density; low open-circuit voltage versus metallic lithium electrodes; high capacity retention; good performance in common electrolytes; high density (e.g. >2.0 $g/cm^3$); good stability during charge and discharge processes, and low cost. At present, the most widely used anode active material is carbonous/carbonaceous material such as natural graphite, artificial graphite and amorphous-based carbon. Amorphous-based carbon has excellent capacity, but the irreversibility thereof is relatively high. The theoretical maximum capacity of natural graphite is 372 mAh/g, but the lifetime thereof is generally short.

In general, carbonous/carbonaceous material anode has low efficiency and cycle performance in the first charge and discharge cycle due to the formation of Solid Electrolyte Interface (SEI) layer. A stable SEI layer is essential in the lithium battery to prevent anode material from reacting with the electrolyte, therefore, the selection of the electrolyte is limited. Only the electrolytes in which a stable SEI layer can be formed are suitable for using in a lithium battery.

Carbon nanotubes are a novel carbonous/carbonaceous material formed by one or more layers of graphite. A distance between two layers of graphite in the carbon nanotube is about 0.34 nanometers, which is greater than the distance between two layers in natural graphite. Thus, carbon nanotube is a suitable material for using as the anode of the lithium battery. However, until now, carbon nanotubes are mixed with a binder and disposed on a current collector of the anode. As such, adsorption ability of the carbon nanotubes is restricted by the binder mixed therewith.

What is needed, therefore, is to provide a cathode of lithium-ion battery that can overcome the above-described shortcomings.

BRIEF DESCRIPTION OF THE DRAWINGS

Implementations of the present technology will now be described, by way of example only, with reference to the attached figures, wherein.

DETAILED DESCRIPTION

Figure 1:
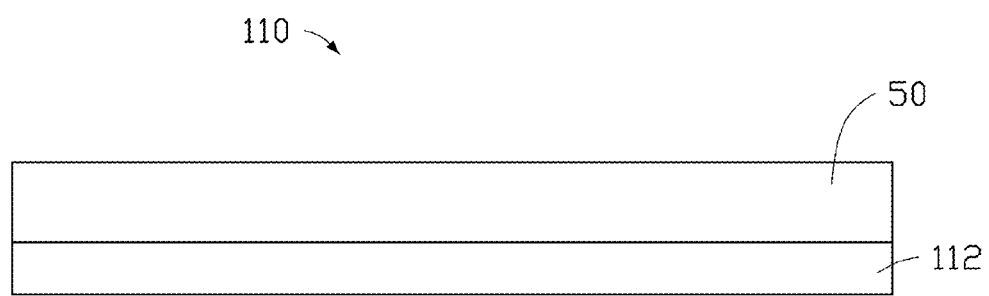
FIG. 1 is a schematic view of one embodiment of a cathode of lithium-ion battery.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Referring to FIG. 1, a cathode 110 of lithium-ion battery includes a negative current collector 112 and a carbon fiber film 50 located on the negative current collector 112. The carbon fiber film 50 can be adhered to a surface of the negative current collector 112 by a conducting binder.

The negative current collector 112 can be a metallic substrate. The material of the negative current collector 112 can be selected from a group consisting of silver, gold, copper, and indium. In one embodiment, the negative current collector 112 is a copper sheet. The area of the negative current collector 112 is substantially the same as the area of the carbon fiber film 50.

Figure 2:
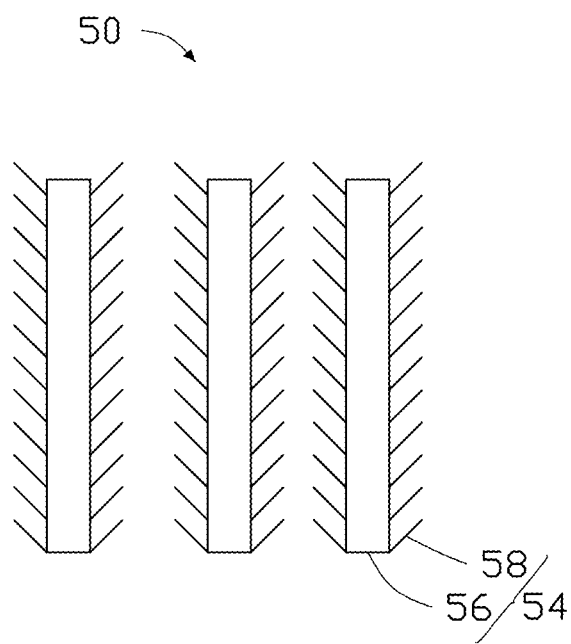
FIG. 2 is a schematic view of a carbon fiber film of the cathode of lithium-ion battery of FIG. 1.
Figure 3:
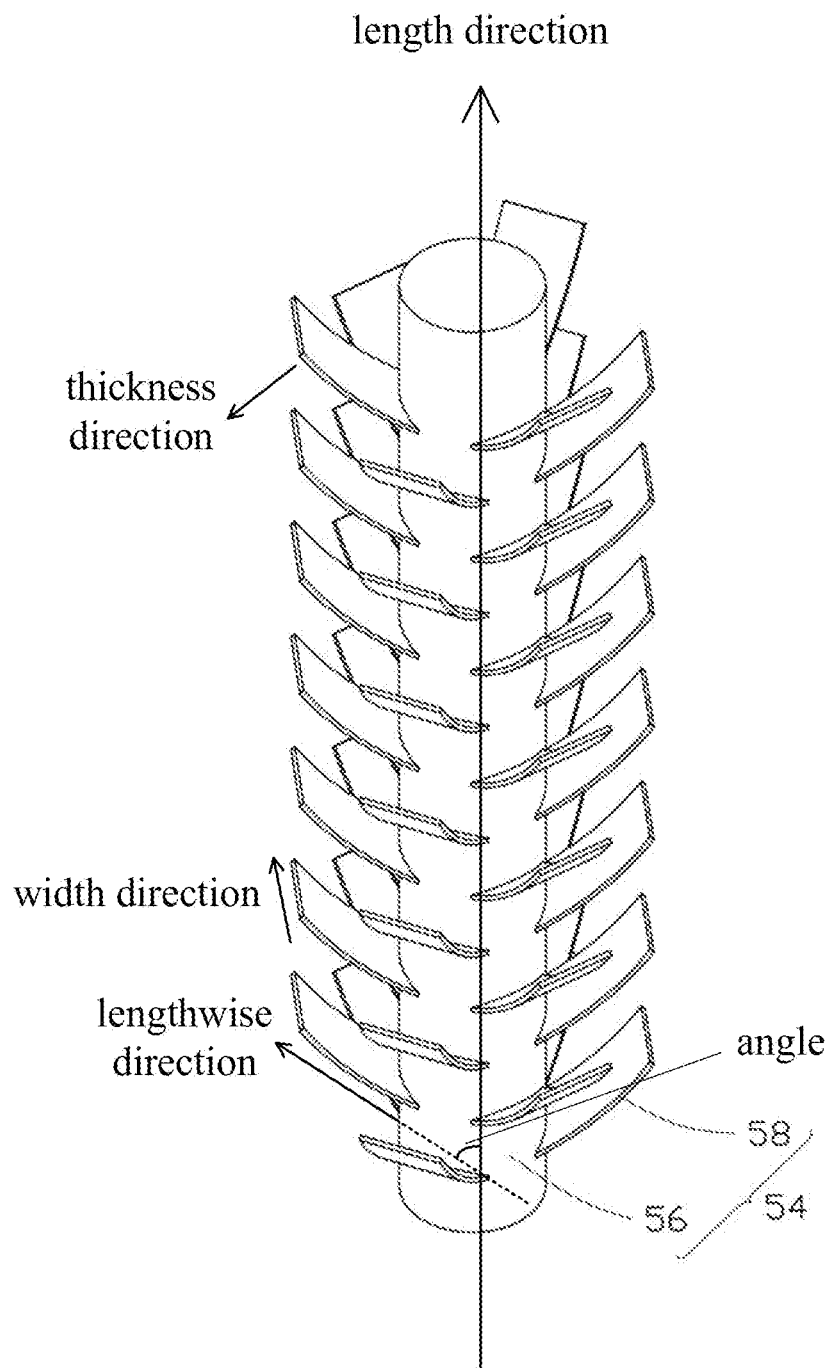
FIG. 3 is a three-dimensional schematic view of one carbon fiber of the carbon fiber film of FIG. 2.

Referring to FIGS. 2 and 3, the carbon fiber film 50 is a membrane structure. The carbon fiber film 50 includes a plurality of carbon nanotubes 56 and a plurality of graphene sheets 58. The plurality of carbon nanotubes 56 are joined end to end by van der Waals attractive force and extend along a same direction. Each of the plurality of carbon nanotubes 56 is surrounded by the plurality of graphene sheets 58. Part of edge of each of the plurality of graphene sheets 58 is joined with the carbon nanotube 56 by covalent bond. An angle is between each graphene sheet 58 and an outside wall of the carbon nanotube 56. The plurality of graphene sheets 58 are interval distribution on the outside wall of the carbon nanotube 56, and a distance between two adjacent graphene sheets 58 is arbitrary. The length of the plurality of graphene sheets 58 is greater than the diameter of the carbon nanotube 56 and ranges from about 50 nanometers to about 10 microns. The width of the plurality of graphene sheets 58 is similar to the diameter of the carbon nanotube 56 and ranges from about 10 nanometers to about 20 nanometers. An extending length of each graphene sheet 58 is 2.5 times-100 times as long as the diameter of the carbon nanotube 56.

The carbon fiber film 50 includes a plurality of carbon fibers 54 joined end to end. The plurality of carbon fibers 54 extends along a same direction. Each carbon fiber 54 includes a carbon nanotube 56 and the plurality of graphene sheets 58. The plurality of graphene sheets 58 forms a graphene layer. Two adjacent carbon fibers 54 are joined by van der Waals attractive force. In the carbon fiber film 50, two adjacent carbon fibers 54 side by side may be spaced apart from each other. Pores are defined in the carbon fiber film 50 by adjacent carbon fibers 54.

The plurality of carbon nanotubes 56 is uniformly distributed and substantially parallel to a surface of the carbon fiber film 50. The carbon fiber film 50 is a free-standing film and can bend to desired shapes without breaking.

Figure 4:
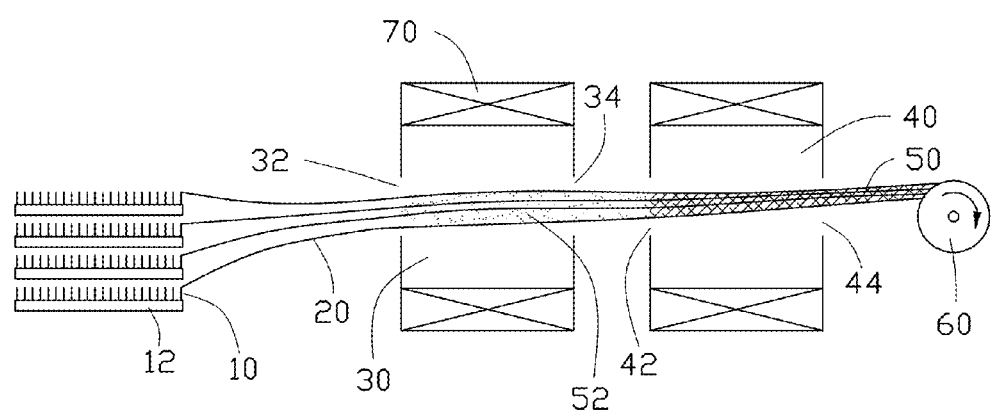
FIG. 4 is a schematic view of one embodiment of a device using for making the carbon fiber film of FIG. 2.

The angle between each graphene sheet 58 and the carbon nanotube 56 can range from about 0 degrees to about 90 degrees. In one embodiment, the angle between each graphene sheet 58 and the carbon nanotube 56 is in a range from about 30 degrees to about 60 degrees. In one embodiment, the angles between each graphene sheet 58 and the carbon nanotube 56 are equal to 45 degrees, as shown in FIG. 4. A diameter of each carbon fiber 54 is related to the thickness of the carbon layer 52. The diameter of the plurality of carbon fibers 54 can be in a range from about 450 nanometers to about 100 microns. In one embodiment, the diameter of the plurality of carbon fibers 54 is about 500 nanometers.

The carbon fiber film 50 can include at least two stacked carbon nanotube films 20, adjacent carbon nanotube films 20 can be combined by only the van der Waals attractive force therebetween. Additionally, an angle between the extending directions of the carbon nanotubes in two adjacent carbon nanotube films 20 can be in a range from about 0 degrees to about 90 degrees. Stacking the carbon nanotube films 20 will improve the mechanical strength of the carbon fiber film 50. In one embodiment, the carbon fiber film 50 includes two layers of the carbon nanotube films 20, and the angle between the extending directions of the carbon nanotubes in two adjacent carbon nanotube films 20 is about 90 degrees.

The carbon fiber film 50 has good electrical conductivity. A sheet resistance of the carbon fiber film 50 is less than or equal to 100 ohm. Two adjacent carbon nanotubes 56 are joined end to end by combining a graphene sheet 58, and the graphene sheet 58 is combined with the two adjacent carbon nanotubes 56 by the covalent bond. Therefore, the mechanical strength of the carbon fiber film 50 is further improved.

Referring to FIG. 4, a method for making the carbon fiber film 50 of one embodiment includes the following steps:

(S10), providing a carbon nanotube array 10;

(S20), forming a carbon nanotube film 20 by pulling from the carbon nanotube array 10, and making the carbon nanotube film 20 successively pass through a first room 30 and a second room 40;

(S30), supplying a carrier gas and a carbon source gas to the first room 30 and forming a carbon layer 52 on the carbon nanotube film 20 located in the first room 30 by controlling a temperature of the first room 30, wherein the carbon nanotube film 20 and the carbon layer 52 form a carbon nanotube composite film; and (S40), taking the carbon nanotube composite film into the second room 40 from the first room 30, and graphitizing the carbon layer 52 by controlling a temperature of the second room.

In the step (S10), the carbon nanotube array 10 can be a super-aligned array formed by a chemical vapor deposition method. The chemical vapor deposition method for making the carbon nanotube array generally includes the following steps:

(S11), providing a substrate 12, wherein the substrate 12 can be a substantially flat and smooth silicon substrate with a diameter of 4 inches, and the silicon substrate can be a P-type silicon wafer, an N-type silicon wafer or a silicon wafer formed with an oxidized layer thereon. In one embodiment, a 4-inch, P-type silicon wafer is used as the substrate 12.

(S12), forming a catalyst layer on the substrate 12, wherein the catalyst layer is made of a material selected from the group consisting of iron (Fe), cobalt (Co), nickel (Ni), and an alloy thereof. In one embodiment, the catalyst layer is Fe;

(S13), annealing the substrate 12 with the catalyst layer in air at a temperature in a range from 700° C. to 900° C. for about 30 minutes to about 90 minutes; and (S14), providing a carbon source gas at high temperature to a furnace for about 5 minutes to about 30 minutes to grow the carbon nanotube array 10 on the substrate 12, wherein the substrate 12 has been put in the furnace which has been heated to a temperature of 400° C.-740° C. and is filled with a protective gas. The carbon source gas can be, e.g., methane, ethylene, propylene, acetylene, methanol, ethanol, or a mixture thereof. The protective gas can, preferably, be made up of at least one of nitrogen (N2), ammonia (NH3), and a noble gas.

Moreover, the carbon nanotube array 10 formed under the above conditions is essentially free of impurities such as carbonaceous or residual catalyst particles. The carbon nanotube array 10 includes a plurality of carbon nanotubes parallel to each other and perpendicular to a top surface of the substrate 12.

In the step (S20), the carbon nanotube film 20 is obtained by extracting a portion of the carbon nanotube array 10 by the substeps of:

(S21), selecting some carbon nanotube segments of the carbon nanotube array 10 having a determined width, and then using a drawing tool with the predetermined width to secure the end of the carbon nanotube segments of the carbon nanotube array 10; and (S22), pulling the drawing tool away from the carbon nanotube at an even/uniform speed to make the carbon nanotube segments of the carbon nanotube array 10 separate from the carbon nanotube array 10.

In the step (S22), the pulling direction can be substantially perpendicular to the growing direction of the carbon nanotube array 10. The drawing tool can be a nipper, a clamp, an adhesive tape, and so on.

In the step (S22), during the extracting process, when the end of the carbon nanotube segments of the carbon nanotubes of the carbon nanotube array 10 is drawn out, other carbon nanotube segments are also drawn out in a manner that ends of a carbon nanotube is connected with ends of adjacent carbon nanotubes, by the help of the van der Waals attractive force between the ends of carbon nanotube segments. This characteristic of the carbon nanotubes ensures that a continuous carbon nanotube film 20 can be formed.

A width of the carbon nanotube film 20 is related to a size of the carbon nanotube array 10. A length of the carbon nanotube film 20 can be selected according to need. In one embodiment, when the carbon nanotube array 10 is 4-inch, the width of the carbon nanotube film 20 is in a range from about 0.5 nanometers to about 10 centimeters, and a thickness of the carbon nanotube film 20 is in a range from about 0.5 nanometers to about 10 microns.

Figure 5:
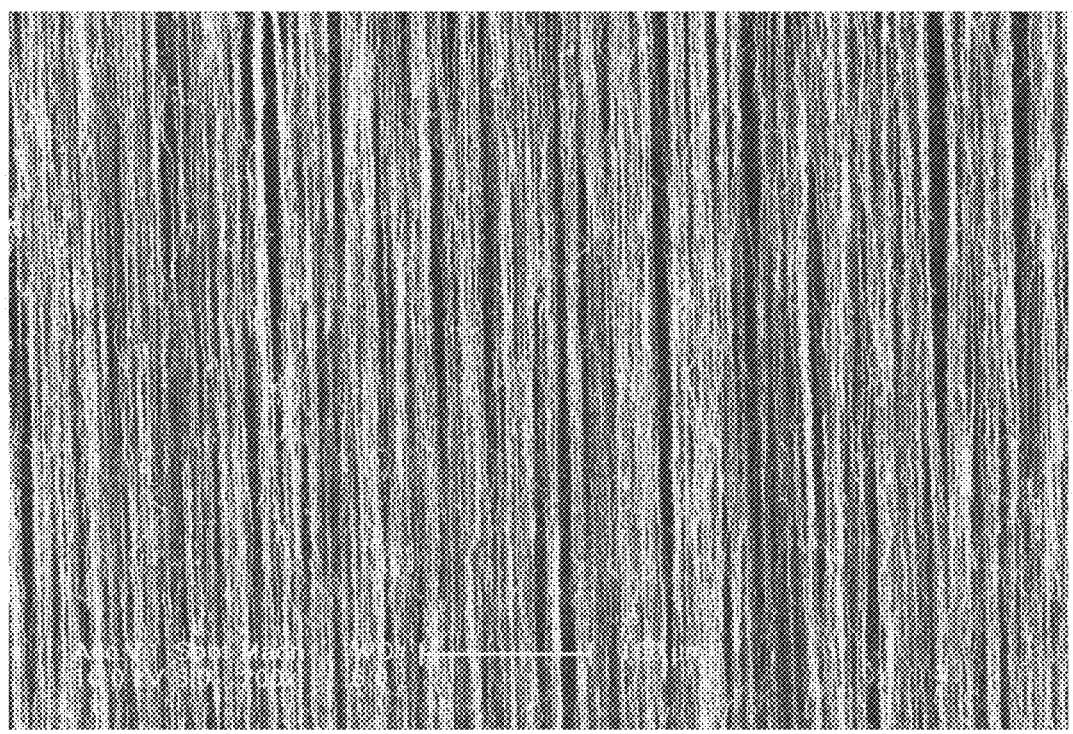
FIG. 5 is a scanning electron microscope (SEM) image of a carbon nanotube film.

Referring to FIG. 5, the carbon nanotube film 20 includes a plurality of carbon nanotubes uniformly distributed therein. The plurality of carbon nanotubes can be combined by van der Waals attractive force. The carbon nanotube film 20 can be a substantially pure structure of the carbon nanotubes, with few impurities. The plurality of carbon nanotubes may be single-walled, double-walled, multi-walled carbon nanotubes, or their combinations. The carbon nanotubes which are single-walled have a diameter of about 0.5 nanometers (nm) to about 50 nm. The carbon nanotubes which are double-walled have a diameter of about 1.0 nm to about 50 nm. The carbon nanotubes which are multi-walled have a diameter of about 1.5 nm to about 50 nm.

The carbon nanotube film 20 is a free-standing film. The term "free-standing" includes, but not limited to, the carbon nanotube film 20 that does not have to be supported by a substrate. For example, the free-standing carbon nanotube film 20 can sustain the weight of itself when it is hoisted by a portion thereof without any significant damage to its structural integrity. So, if the free-standing carbon nanotube film 20 is placed between two separate supporters, a portion of the free-standing carbon nanotube film 20, not in contact with the two supporters, would be suspended between the two supporters and yet maintain film structural integrity.

The first room 30 can define a first inlet opening 32 and a first outlet opening 34 opposite to the first inlet opening 32. The second room 40 can define a second inlet opening 42 and a second outlet opening 44 opposite to the second inlet opening 42. The carbon nanotube film 20 is successively pass through entire first room 30 and entire second room 40 by using the drawing tool, and fixed on a supporting shaft 60, as shown in FIG. 1. The supporting shaft 60 can rotate around its axis, the carbon nanotube film 20 can be collected on the supporting shaft 60.

In the step (S30), forming the carbon layer 52 on the carbon nanotube film 20 includes the following steps:

(S31), supplying the carrier gas to the first room 30;

(S32), supplying the carbon source gas to the first room 30; and (S33), heating the first room 30 to a temperature from about 800 degrees Celsius to about 1000 degrees Celsius, and cracking the carbon source gas to form a plurality of amorphous carbons, wherein the plurality of amorphous carbons is deposited on the carbon nanotube film 20 in the first room 30.

In the step (S31), the first room 30 can be purified by the carrier gas. The carrier gas includes nitrogen, ammonia, or inert gas, such as argon. A flow speed of the carrier gas can range from about 50 sccm to about 100 sccm.

In the step (S32), the carbon source gas can be a hydrocarbon compound, such as alkyne. A flow speed of the carrier gas can range from about 20 sccm to about 100 sccm.

In the step (S33), a heater 70 surrounds the first room 30 and heats the first room 30 to the temperature from about 800 degrees Celsius to about 1000 degrees Celsius. In one embodiment, when a time of supplying the carbon source gas ranges from about 30 minters to about 60 minters, a thickness of the carbon layer 52 ranges from about 5 nanometers to about 10 microns. In order to uniformly cover the carbon nanotube film 20 and enclose each of the plurality of carbon nanotubes, the thickness of the carbon layer 52 is greater than or equal to 5 nanometers. The thickness of a composite structure including the carbon layer 52 and the carbon nanotube film 20 is greater than or equal to 30 nanometers.

In the process of forming the carbon layer 52, a pressure in the first room 30 can be in a range from about 50 Pa to about 1000 Pa. The carbon nanotube film 20 cannot be destroyed because the inert gas is in the first room 30 and the pressure in the first room 30 ranges from about 50 Pa to about 1000 Pa.

The carrier gas and the carbon source gas can be simultaneously supplied to the first room 30. At this time, the flow speed of the carrier gas ranges from about 10 sccm to about 50 sccm. In one embodiment, the carrier gas and the carbon source gas are simultaneously supplied to the first room 30, the flow speed of the carrier gas is 25 sccm, and the flow speed of the carbon source gas is 50 sccm.

The carbon nanotube film 20 defines a plurality of micropores, which is formed by two adjacent carbon nanotubes of the carbon nanotube film 20. The plurality of amorphous carbons formed by cracking the carbon source gas is deposited on a surface of the plurality of carbon nanotubes, and deposited in the plurality of micropores. The carbon layer 52 thus encloses each of the plurality of carbon nanotubes.

In the step (S40), the supporting shaft 60 is rolled, and the carbon nanotube film 20 continues to be pulled from the carbon nanotube array 10. The carbon nanotube composite film in the first room 30 is passed through the first outlet opening 34 and the second inlet opening 42 and into the second room 40.

There is a vacuum in the second room 40. A pressure in the second room 40 ranges from about 50 Pa to about 1000 Pa. The heater 70 surrounds the second room 40 and heats the second room 40 to a temperature from about 2000 degrees Celsius to about 3000 degrees Celsius. The carbon layer 52 thus is graphitized. A plurality of carbons of the carbon layer 52 is changed to $SP^2$ hybrid structure joined with covalent bond from amorphous. The carbon nanotube film 20 cannot be destroyed in the second room 40 because the vacuum is in the second room 40. The plurality of carbon nanotubes of the carbon nanotube film 20 is $SP^2$ hybrid graphene layer structure. Original structure defects of the plurality of carbon nanotubes in the carbon nanotube film 20 can be repaired by heating in the vacuum.

In one embodiment, when the thickness of the carbon layer 52 is greater than a diameter of the plurality of carbon nanotubes, after graphitizing the carbon layer 52 to form a plurality of graphene sheets, it is difficult for the graphene sheets to be parallel to extending directions of the carbon nanotubes. Therefore, an angle can be formed between each graphene sheet and each carbon nanotube. In one embodiment, the thickness of the carbon layer 52 is greater than or equal to 100 nanometers.

A length of the plurality of graphene sheets is greater than the diameter of the plurality of carbon nanotubes and in a range from about 50 nanometers to about 10 microns. A width of the plurality of graphene sheets is in a range from about 10 nanometers to about 20 nanometers. A time for graphitizing the carbon layer 52 is related to the thickness of the carbon layer 52. The greater the thickness of the carbon layer 52, the longer the time lasts. In one embodiment, the thickness of the carbon layer 52 is in a range from about 100 nanometers to about 10 microns, the time for graphitizing the carbon layer 52 is in a range from about 20 minutes to about 60 minutes.

The carbon layer 52 is graphitized to the plurality of graphene sheets, and the plurality of graphene sheets is joined with the carbon nanotube film 20, thus the carbon fiber film 50 is formed.

The supporting shaft 60 is rolled along the direction of pulling the carbon nanotube film 20, and the carbon nanotube film 20 continues to be pulled from the carbon nanotube array 10, at the same time the carbon layer 52 in the first room 30 is passed through the first outlet opening 34 and the second inlet opening 42 and into the second room 40 and graphitized in the second room 40.

Figure 6:
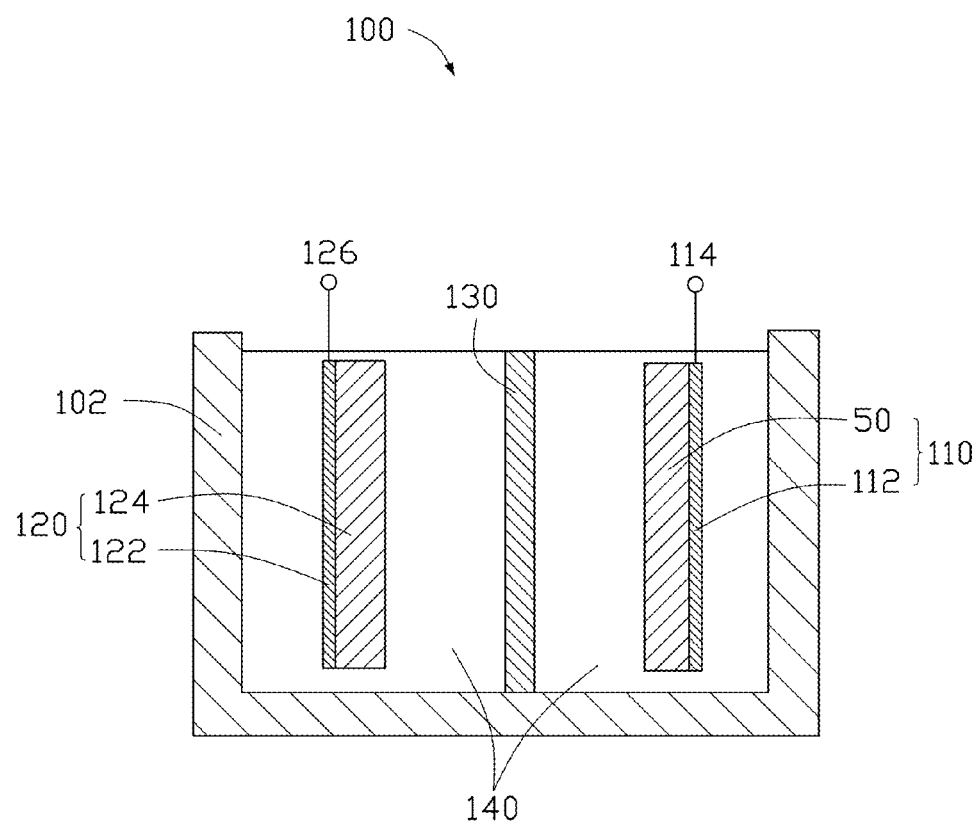
FIG. 6 is a schematic view of a lithium-ion battery.

Referring to FIG. 6, a lithium battery 100 includes a container 102, an anode 120, a cathode 110, an electrolyte 140, and a separator 130. The anode 120, the cathode 110, the electrolyte 140, and the separator 130 are disposed in the container 102. The electrolyte 140 is filled in the container 102. The cathode 110 and the anode 120 are separated by the separator 130. The cathode 110 and the separator 130 keep a certain distance from each other. The anode 120 and the separator 130 keep a certain distance from each other.

The anode 120 includes a positive current collector 122 and a positive active material layer 124 disposed thereon. The positive active material layer 124 is located between the positive current collector 122 and the separator 130. The cathode 110 includes the negative current collector 112 and the carbon fiber film 50 disposed thereon. The positive active material layer 124 and the carbon fiber film 50 face each other. The carbon fiber film 50 is located between the negative current collector 112 and the separator 130. A positive terminal 126 and a negative terminal 114 are respectively disposed on the tops of the positive current collector 122 and the negative current collector 112.

The materials of the anode 120, the separator 130, and the electrolyte 140 can be selected according to need. In one embodiment, the positive active material layer 124 is made of lithium metal or lithium transition metal oxides, the material of the separator 130 is polyolefin. The electrolyte 140 can be 1 mol/L Lithium Hexafluorophosphate ($LiPF_6$) in Ethylene Carbonate (EC) and Diethyl Carbonate (DEC). A volume ratio of EC and DEC is 1:1.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Additionally, it is also to be understood that the above description and the claims drawn to a method may include some indication in reference to certain steps. However, the indication used is only to be viewed for identification purposes and not as a suggestion as to an order for the steps.

What is claimed is:

1. A cathode of lithium-ion battery comprising:
   at least one carbon nanotube film comprising a plurality of carbon nanotubes joined end to end and extending along a same direction;
   wherein each of the plurality of carbon nanotubes is joined with a plurality of graphene sheets, an angle is defined between a lengthwise direction of each of the plurality of graphene sheets and a length direction of each of the plurality of carbon nanotubes, and the angle is from about 30 degrees to about 60 degrees.

2. The cathode of lithium-ion battery of claim 1, wherein an outside wall of each of the plurality of carbon nanotubes is joined with the plurality of graphene sheets by a covalent bond.

3. The cathode of lithium-ion battery of claim 1, wherein the plurality of carbon nanotubes is substantially parallel to a surface of the at least one carbon nanotube film.

4. The cathode of lithium-ion battery of claim 1, further comprising a negative current collector, and the carbon fiber film is located on the negative current collector.

5. The cathode of lithium-ion battery of claim 1, wherein the plurality of graphene sheets is distributed only on an outside wall of the plurality of carbon nanotubes.

6. The cathode of lithium-ion battery of claim 1, wherein a length of the plurality of graphene sheets is greater than a diameter of the plurality of carbon nanotubes.

7. The cathode of lithium-ion battery of claim 1, wherein a width of the plurality of graphene sheets is from about 10 nanometers to about 20 nanometers.

8. The cathode of lithium-ion battery of claim 1, wherein an extending length of each of the plurality of graphene sheets is 2.5 times-100 times as long as a diameter of each of the plurality of carbon nanotubes.

9. A cathode of lithium-ion battery comprising:
   a plurality of carbon nanotube films comprising a plurality of carbon nanotubes extending along a same direction;
   wherein each of the plurality of carbon nanotubes is surrounded by a plurality of graphene sheets and joined with the plurality of graphene sheets, an angle is defined between a lengthwise direction of each of the plurality of graphene sheets and a length direction of each of the plurality of carbon nanotubes, and the angle is from about 30 degrees to about 60 degrees.

10. The cathode of lithium-ion battery of claim 9, wherein an angle between extending directions of the plurality of carbon nanotubes in two adjacent carbon nanotube films is from about 0 degrees to about 90 degrees.

* * * * *